(12) United States Patent
Bai

(10) Patent No.: US 11,274,932 B2
(45) Date of Patent: Mar. 15, 2022

(54) NAVIGATION METHOD, NAVIGATION DEVICE, AND STORAGE MEDIUM

(71) Applicant: GUANGDONG OPPO MOBILE TELECOMMUNICATIONS CORP., LTD., Guangdong (CN)

(72) Inventor: Jian Bai, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 203 days.

(21) Appl. No.: 16/688,457

(22) Filed: Nov. 19, 2019

(65) Prior Publication Data

US 2020/0088533 A1 Mar. 19, 2020

Related U.S. Application Data

(63) Continuation of application No. PCT/CN2018/088451, filed on May 25, 2018.

(30) Foreign Application Priority Data

Jun. 14, 2017 (CN) .......................... 201710448666.7

(51) Int. Cl.
*G01C 21/34* (2006.01)
(52) U.S. Cl.
CPC ................. *G01C 21/3446* (2013.01)
(58) Field of Classification Search
CPC ......... G10L 15/18; G10L 15/22; G10L 15/26; G01C 21/3682; G01C 21/3484; G01C 21/3667; G01C 21/3476; G01C 21/3641; G01C 21/3461; G01C 21/3446; G01C 21/3617; G01C 21/3608; G01C 21/3423;
(Continued)

(56) References Cited

U.S. PATENT DOCUMENTS 8,855,901 B2* 10/2014 Leader .................. G01C 21/20
701/117
9,618,343 B2* 4/2017 Kahn .................. G01C 21/3617
(Continued)

FOREIGN PATENT DOCUMENTS

CN 101153907 A 4/2008
CN 101939740 A * 1/2011 ......... G06Q 30/0261
(Continued)

OTHER PUBLICATIONS

European partial search report, EP18817764, dated May 20, 2020 (13 pages).
(Continued)

*Primary Examiner* — Thomas G Black
*Assistant Examiner* — Ellis Bernardo Ramirez
(74) *Attorney, Agent, or Firm* — Young Basile Hanlon & MacFarlane, P.C.

(57) ABSTRACT

A navigation method and a related product are described. The method includes acquiring a message record; parsing the message record to obtain a starting location and a destination location; using N pre-installed map applications to perform route planning for the starting location and the destination location so as to obtain M routes, wherein N is a positive integer and M is a positive integer not less than N; and selecting a target route from among the M routes.

16 Claims, 4 Drawing Sheets

(58) Field of Classification Search
CPC ............ G01C 21/3647; G06F 16/3344; G06F 17/30684; G06F 17/28; G06F 17/30654; G06F 17/2229; G06F 17/3043
USPC .... 701/400, 532, 538, 541, 424; 704/7, 251, 704/257, 270
See application file for complete search history.

(56) References Cited

U.S. PATENT DOCUMENTS

| | | | |
|---|---|---|---|
| 2006/0116818 A1* | 6/2006 | Chao | G01C 21/3446 701/431 |
| 2009/0150156 A1* | 6/2009 | Kennewick | G10L 15/00 704/257 |
| 2012/0101809 A1 | 4/2012 | Kennewick et al. | |
| 2014/0279723 A1* | 9/2014 | McGavran | H04L 67/10 706/11 |
| 2014/0343841 A1* | 11/2014 | Faaborg | G01C 21/3691 701/465 |
| 2015/0168174 A1* | 6/2015 | Abramson | G01C 21/3626 701/408 |
| 2015/0323340 A1* | 11/2015 | McGavran | G01C 21/3423 701/425 |
| 2016/0109243 A1* | 4/2016 | Tseng | G01C 21/3484 701/408 |
| 2017/0177710 A1* | 6/2017 | Burlik | G01C 21/3667 |
| 2017/0357716 A1* | 12/2017 | Bellegarda | G06F 3/16 |

FOREIGN PATENT DOCUMENTS

| | | |
|---|---|---|
| CN | 102542836 A | 7/2012 |
| CN | 103425640 A | 12/2013 |
| CN | 103488758 A | 1/2014 |
| CN | 103674039 A | 3/2014 |
| CN | 104075720 A | 10/2014 |
| CN | 104121908 A | 10/2014 |
| CN | 105260455 A | 1/2016 |
| CN | 105373808 A | 3/2016 |
| CN | 105628048 A | 6/2016 |
| CN | 105973255 A | 9/2016 |
| CN | 106096000 A | 11/2016 |
| CN | 106156084 A | 11/2016 |
| CN | 106407393 A | 2/2017 |
| CN | 106595686 A * | 4/2017 |
| CN | 106595686 A | 4/2017 |
| CN | 107356261 A | 11/2017 |
| WO | 2011072743 A1 | 6/2011 |

OTHER PUBLICATIONS

English translation of First Office Action issued for a counterpart Chinese patent Application 201710448666.7, dated May 8, 2019 (11 pages).
International search report, PCT/CN2018/088451, dated Jul. 31, 2018 (2 pages).
English translation of Notification of Grant Patent for the CN Application 201710448666.7, dated Jul. 30, 2019 (3 pages).
European search report, EP18817764, dated Aug. 20, 2020 (12 pages).
Indian First Examination Report, Application No. 201917048356 dated Feb. 22, 2020 (6 pages).

* cited by examiner

NAVIGATION METHOD, NAVIGATION DEVICE, AND STORAGE MEDIUM

CROSS-REFERENCE TO RELATED APPLICATION(S)

The present disclosure is a continuation application of International Patent Application No. PCT/CN2018/088451, filed on May 25, 2018, which claims priority to Chinese Patent Application No. 201710448666.7, filed on Jun. 14, 2017, the entire contents of both of which are hereby incorporated by reference in their entireties.

TECHNICAL FIELD

The present disclosure relates to the technical field of electronic device, and in particular to a navigation method, a navigation device, and a non-transitory storage medium.

BACKGROUND

As smart phones become popularized, smart phones can support more and more applications and have more and more functions. Smart phones have been developed to be diverse and personalized and have become indispensable electronic products in people's life. More and more research show that, means in which software runs and in which users use a smart phone are key factors determining energy consumption and efficiency of a system of the smart phone.

At present, in the related art, navigation as a popular application of mobile phones has become an assistant in daily life of the users. However, different maps may provide different navigation routes, and users are required to input a starting position and a destination for the navigation, and thus it is relatively tedious. An urgent need in the related art may be providing an intelligent navigation mode for users.

SUMMARY

According to a first aspect of the present disclosure, a navigation method may be provided and adapted to an electronic device, including: acquiring a message record; analyzing the message record to obtain a starting location and a destination location; performing route planning based on the starting location and the destination location through N map applications installed in the electronic device to obtain M routes, wherein N is a positive integer, and M is a positive integer not less than N; and selecting a target route from the M routes.

According to a second aspect, a navigation device may be provided, including a processor and a non-transitory memory. The non-transitory memory stores a plurality of instructions. The plurality of instructions may be executed by the processor to perform a method of navigation. The method may include: acquiring a message record; analyzing the message record to obtain a starting location and a destination location; performing route planning based on the starting location and the destination location through N map applications installed to obtain M routes, wherein N is a positive integer, and M is a positive integer not less than N; and selecting a target route from the M routes.

According to a third aspect, a non-transitory computer readable storage medium may be provided. The non-transitory computer readable storage medium may store a plurality of instructions, wherein the plurality of instructions may be executed by a processor to perform a method for navigation. The method may include: acquiring a message record; analyzing the message record to obtain a starting location and a destination location; performing route planning based on the starting location and the destination location through N map applications installed in the electronic device to obtain M routes, wherein N is a positive integer, and M is a positive integer not less than N; and selecting a target route from the M routes.

BRIEF DESCRIPTION OF DRAWINGS

To illustrate technical solutions provided in embodiments of the present disclosure or in the prior art in details, the accompanying drawings necessary for description of the embodiments or the prior art will be introduced briefly hereinafter. Obviously, the drawings in the following description only illustrate some of the embodiments of the present disclosure, and those ordinary skilled in the related art can further obtain other drawings according to the drawings provided herein without making creative efforts.

DETAILED DESCRIPTION

Figure 1:
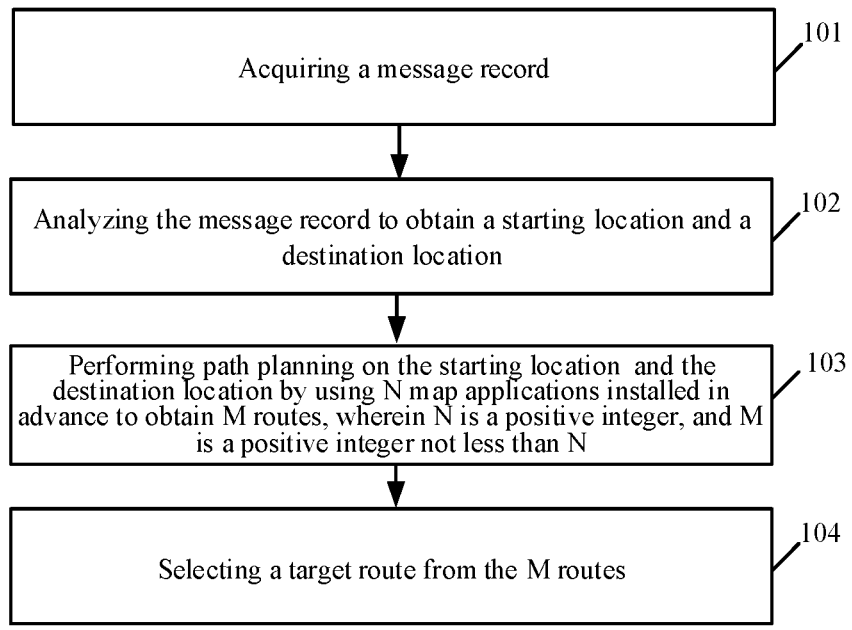
FIG. 1 is a flow chart of a navigation method according to an embodiment of the present disclosure.

In order to enable the skilled in the related art to better understand solutions of the present disclosure, technical solutions of embodiments of the present disclosure will be described clearly and completely with reference to the accompanying drawings illustrating the embodiments of the present disclosure. Obviously, the embodiments described are only a part of but not all of the embodiments of the present disclosure. All other embodiments that can be obtained by those of ordinary skill in the art from the embodiments of the present disclosure without making creative efforts shall fall within the scope of the present disclosure.

Terms such as "first", "second" or the like used in the specification, the claims and the aforesaid accompanying drawings of the present disclosure are used for distinguishing different objects instead of describing a particular order. Moreover, terms "including" and "having" as well as any variants thereof are intended to encompass non-exclusive inclusion. For example, a process, a method, a system, a product or a device including a series of operations or units are not limited to these operations or units that are clearly listed, but may optionally include other operations or units that are not clearly listed or may optionally include other operations or units that are inherent to the process, the method, the product or the device.

Reference to "embodiment" herein means that a particular feature, a structure or characteristics described in connection with an embodiment may be included in at least one embodiment of the present disclosure. The word appearing at various positions in the present specification does not necessarily refer to the same embodiment, and does not refer to an independent or alternative embodiment that is mutually exclusive with other embodiments. As can be apparently or implicitly appreciated by those skilled in the art, the embodiments described herein may be combined with other embodiments.

The electronic device involved in the embodiments of the present disclosure may include various handheld devices with wireless communication functions, vehicle-mounted devices, wearable devices, computing devices or other processing devices connected to wireless modems, as well as various forms of user equipments (UEs), mobile stations (MSs), terminal devices, or the like. For convenience of description, the above-mentioned devices are collectively referred to as electronic devices. An embodiment of the present disclosure will be described in detail below.

Alternatively, the electronic device in the embodiment of the present disclosure may be installed with an artificial intelligence (AI) module, and the AI module may be installed in the electronic device independently from the processor, and of course, may also be integrated with the processor. The AI module may be a quantum chip or a high-density silicon integrated circuit, and a machine learning algorithm may be stored in the AI module for training user usage habits (message records) and in-depth learning of user usage habits, thereby achieving the purpose of intelligently controlling the electronic device through the artificial intelligence module.

According to a first aspect of the present disclosure, a navigation method may be provided and adapted to an electronic device, including: acquiring a message record; analyzing the message record to obtain a starting location and a destination location; performing route planning based on the starting location and the destination location through N map applications installed in the electronic device to obtain M routes, wherein N is a positive integer, and M is a positive integer not less than N; and selecting a target route from the M routes.

In some embodiments, the analyzing the message record to obtain a starting location and a destination location includes: extracting A location names from the message record, wherein A is an integer greater than or equal to 2; and determining the starting location and the destination location in combination with the context of the message record in which each of the A location names is located.

In some embodiments, the determining the starting location and the destination location in combination with the context of the message record in which each of the N location names is located includes: screening the A location names to obtain B location names, wherein the B location names are phrased with keywords suggesting a moving direction, and B is an integer less than N and not less than 2; performing semantic analysis on the B location names in combination with the context of the message record in which each of the B location names is located, determining a first probability value of each of the B location names being the starting location and a second probability value of each of the B location names being the destination location, such that obtaining B first probability values and B second probability values; and selecting a maximum first probability value and a maximum second probability value from the B first probability values and the B second probability values, and setting a location name corresponding to the maximum first probability value as the starting location and a location name corresponding to the maximum second probability value as the destination location.

In some embodiments, the selecting a target route from the M routes includes: acquiring N groups of data showing usage habits and user travel data corresponding to the N map applications; evaluating each of the M routes according to the N groups of data showing usage habits and user travel data to obtain M evaluation values; and selecting a maximum evaluation value from the M evaluation values, and taking a route corresponding to the maximum evaluation value as the target rout.

In some embodiments, the evaluating each of the M routes according to the N groups of data showing usage habits and the user travel data to obtain M evaluation values includes: determining a first weight value of each of the M routes according to the N groups of usage habit data to obtain M first weight values; determining a second weight value of each of the M routes according to the user travel data to obtain M second weight values; and determining a selection probability of each of the M routes according to the M first weight values and the M second weight values to obtain the M evaluation values.

In some embodiments, the data showing usage habits includes at least one of the number of times of activating each map application, time spent on each map application, and preferred navigation modes of each map application.

In some embodiments, a map application corresponding to the target route may be invoked, and the target route may be displayed on a display interface of the electronic device.

In some embodiments, the message record includes message records within a preset time period, and the message record includes at least one of a text message record, a voice record and a chat record.

In some embodiments, the method further includes: acquiring a confirmation instruction input by a user to confirm the starting location and the destination location; executing the performing route planning based on the starting location and the destination location through N map applications installed in the electronic device to obtain M routes in response to the starting location and the destination location being confirmed to be correct, wherein N is a positive integer, and M is a positive integer not less than N; and inputting a correct starting location and a correct destination location by the user for route planning in response to the starting location and the destination location being confirmed to be incorrect.

According to a second aspect, a navigation device may be provided, including a processor and a non-transitory memory. The non-transitory memory stores a plurality of instructions. The plurality of instructions may be executed by the processor to perform a method of navigation. The method may include: acquiring a message record; analyzing the message record to obtain a starting location and a destination location; performing route planning based on the starting location and the destination location through N map applications installed to obtain M routes, wherein N is a positive integer, and M is a positive integer not less than N; and selecting a target route from the M routes.

In some embodiments, the analyzing the message record to obtain a starting location and a destination location includes: extracting A location names from the message record, wherein A is an integer greater than or equal to 2; and determining the starting location and the destination location in combination with the context of the message record in which each of the A location names is located.

In some embodiments, the determining the starting location and the destination location in combination with the context of the message record in which each of the A location names is located includes: screening the A location names to obtain B location names, wherein the B location names are phrased with keywords suggesting a moving direction, and B is an integer less than N and not less than 2; performing semantic analysis on the B location names in combination with the context of the message record in which each of the B location names is located, determining a first probability value of each of the B location names being the starting location and a second probability value of each of B location name being a destination location, and obtaining B first probability values and B second probability values; and selecting a maximum first probability value and a maximum second probability value from the B first probability values and the B second probability values, and setting a location name corresponding to the maximum first probability value as the starting location and a location name corresponding to the maximum second probability value as the destination location.

In some embodiments, the selecting a target route from the M routes includes: acquiring N groups of data showing usage habits and user travel data corresponding to the N map applications; evaluating each of the M routes according to the N groups of data showing usage habits and the user travel data to obtain M evaluation values; and selecting a maximum evaluation value from the M evaluation values, and taking a route corresponding to the maximum evaluation value as the target route.

In some embodiments, the evaluating each of the M routes according to the N groups of data showing usage habits and the user travel data to obtain M evaluation values includes: determining a first weight value of each of the M routes according to the N groups of data showing usage habits to obtain M first weight values; determining a second weight value of each of the M routes according to the user travel data to obtain M second weight values; and determining a selection probability of each of the M routes according to the M first weight values and the M second weight values to obtain the M evaluation values.

In some embodiments, the data showing usage habits includes at least one of the number of times of activating each map application, time spent on each map application, and preferred navigation modes of each map application.

In some embodiments, a map application corresponding to the target route may be invoked, and the target route may be displayed on a display interface of the navigation device.

In some embodiments, the message record includes message records within a preset time period, and the message record includes at least one of a text message record, a voice record and a chat record.

In some embodiments, the method further includes: acquiring a confirmation instruction input by a user to confirm the starting location and the destination location; executing the performing route planning based on the starting location and the destination location through N map applications installed in the electronic device to obtain M routes in response to the starting location and the destination location being confirmed to be correct, wherein N is a positive integer, and M is a positive integer not less than N; and inputting a correct starting location and a correct destination location by the user for route planning in response to the starting location and the destination location being confirmed to be incorrect.

According to a third aspect, a non-transitory computer readable storage medium may be provided. The non-transitory computer readable storage medium may store a plurality of instructions, wherein the plurality of instructions may be executed by a processor to perform a method for navigation. The method may include: acquiring a message record; analyzing the message record to obtain a starting location and a destination location; performing route planning based on the starting location and the destination location through N map applications installed in the electronic device to obtain M routes, wherein N is a positive integer, and M is a positive integer not less than N; and selecting a target route from the M routes.

In some embodiments, the analyzing the message record to obtain a starting location and a destination location includes: extracting A location names from the message record, wherein A is an integer greater than or equal to 2; and determining the starting location and the destination location in combination with the context of the message record in which each of the A location names is located.

As shown in FIG. 1, a flow chart of a navigation method according to an embodiment of the present disclosure may be illustrated. The navigation method described in this embodiment includes following operations.

101: a message record may be acquired.

A source of the message record may include, for instance, a text message record obtained from messages forwarded by a base station, a voice record obtained from voice information of chat records of instant messaging tools, wherein the chat records may be obtained from text records of instant messaging tools (WeChat, QQ, or the like.).

Alternatively, the message record may be a message record within a preset time period, and the message record may include at least one of a text message record, a voice record and a chat record.

The message record may include, but is not limited to, a text message record, a voice record, a chat record or the like. The message record may be a message record within a preset time period, for example, the last 1 hour, the last half day, or the like. The message record in the operation 101 may be a message record within a preset time period. The above preset time period may be set by the user or a default value set by the system. For example, the message record may be a message record in the last 10 minutes.

102. the message record may be analyzed to obtain a starting location and a destination location.

In many cases, there may be a starting location and a destination location in the message record, and thus, the message record can be analyzed to identify the starting location and the destination location from the message record. For example, when we chat on QQ, we may make an appointment with our friends. During the chat, we may say messages such as where to meet and where to start or the like, and the starting location and the destination location can be obtained from the chat record.

Alternatively, the above operation 102 of analyzing the message record to obtain a starting location and a destination location may include following operations.

21). A number of (N) location names may be extracted from the message record, wherein N is an integer greater than or equal to 2;

22). The starting location and the destination location may be determined by considering the context of the message record in which each of the N location names is located.

The message record may contain a plurality of location names. Therefore, firstly, N location names in the message record may be extracted, wherein N is an integer greater than or equal to 2. Then, a name of the starting location and a name of the destination location may be determined in combination with the context of the message record in which each of the N location names is located.

Alternatively, the above operation 22 of determining the starting location and the destination location in combination with the context of the message record in which each of the N location names is located may include following operations.

221). The N location names may be screened to obtain M location names, wherein M is an integer less than N and not less than 2;

222). Semantic analysis on the M location names may be performed in combination with the context of the message record in which each of the M location names is located, such that a first probability value of each of the M location names being a starting location and a second probability value of each of the location name being a destination location may be determined. That is, there may be M first probability values and M second probability values.

223). A maximum first probability value and a maximum second probability value may be selected from the M first probability values and the M second probability values. A location name corresponding to the maximum first probability value may be set as the starting location and a location name corresponding to the maximum second probability value may be set as the destination location.

Alternatively, some of the N location names may refer to a relatively large region, causing ambiguous positioning, and such location names may be filtered out. For example, if the location name is the United States which is very large, then accurate positioning cannot be achieved. After performing screening on the N location names, M location names remain, and M is an integer less than N and not less than 2. Further, semantic analysis may be performed on the M location names in combination with the context of the message record in which each of the M location names is located to obtain at least one keyword. The keyword may be connected with a location name to form a phrase, thus, indicating a possibility of the location being the starting location or the destination location, such that a probability value suggesting the location name phrased with the keyword being a starting location or a destination location may be obtained. In the process, corresponding relationship between the keyword and the probability value may be preset. For example, if the keyword is "to", then the probability value of a location name phrased with "to" being the destination location may be 85%, and the probability value of the location name being the starting location may be 15%. For example, if a word "departure" appears in a close context of a location name A, then the location name A may be the starting location; and if a word "to" appears in a close context of a location name B, then the location name B may be the destination location. In this way, the first probability value of taking each of the M location names as the starting location and the second probability value of taking each of the M location names as the destination location may be determined. M first probability values and M second probability values may be obtained, and a maximum first probability value and a maximum second probability value may be selected from the M first probability values and the M second probability values. The location name corresponding to the maximum first probability value may be regarded as the starting location and a location name corresponding to the maximum second probability value may be regarded as the destination location. According to the above operations, the starting location and the destination location can be determined through the analysis such that the electronic device may generate navigation using the two positions.

103: route planning may be performed based on the starting location and the destination location by using N map applications installed in advance to obtain M routes, wherein N is a positive integer, and M is a positive integer not less than N.

The map applications may be at least one of a google map, a Baidu map, a Gaode map or the like. N map applications may be installed in the electronic device, and the N map applications may be used to perform route planning based on the starting location and the destination location to obtain M routes, wherein N is a positive integer, and M is a positive integer not less than N. For a map application, different routes may be obtained during planning according to bus routes, self-driving or walking, so more than N routes may be obtained by the N map applications.

Alternatively, a following operation may be further included between the above operations 102 and 103.

A confirmation instruction input by a user confirming the starting location and the destination location may be acquired. When the starting location and the destination location are confirmed to be correct, the operation 103 may be executed.

The starting location and the destination location determined by the electronic device through the analysis may deviate from correct locations. For example, different locations may have a same location name. Therefore, a confirmation instruction input by a user to confirm the starting location and the destination location may be acquired. When the starting location and the destination location are confirmed to be correct, the operation 103 may be executed. Of course, the user may also modify the starting location and the destination location such that the navigation can be achieved more accurately.

104: a target route may be selected from the M routes.

Generally, the user will choose a route as a final navigation route, and therefore, one route may be selected from the M routes as a target route. For example, the target route may be a navigation route with a shortest distance, or as another example, the target route may be a navigation route with a minimum number of traffic lights, and as another example, the target route may be a navigation route with least traffic flow.

Alternatively, the above operation 104 of selecting a target route from the M routes may include following operations.

41). N groups of data showing usage habit and user travel corresponding to the N map applications may be acquired.

42). Each of the M routes according to the N groups of data showing usage habit and user travel may be evaluated to obtain M evaluation values.

43). A maximum evaluation value from the M evaluation values may be selected, and a route corresponding to the maximum evaluation value may be selected as the target route.

The data showing usage habits may include at least one of the number of times of using each map application, time spent on using each map application, and a preferred navigation mode of each map application. To be specific, the data showing usage habits may include, but may not be limited to, the number of times of using each map application, the time spent on using each map application, and preferred navigation modes of each map application (self-driving, walking, etc.) or the like. User travel data may include, but is not limited to, travel time and a travel mode corresponding to the travel time or the like. N groups of data showing usage habits corresponding to N map applications may be obtained, each map application corresponds to a group of data showing usage habits and user travel data, and each of the M routes is evaluated according to the N groups of data showing usage habits and the user travel data to obtain M evaluation values. A maximum evaluation value may be selected from the M evaluation values, and the route corresponding to the maximum evaluation value may be taken as the target route.

Alternatively, the above operation 42 of evaluating each of the M routes according to the N groups of data showing usage habits and the user travel to obtain M evaluation values may include following operations.

421). A weight value of each of the M routes may be determined based on the N groups of data showing usage habits to obtain M first weight values.

422). A weight value of each of the M routes may be determined based on the user travel data to obtain M second weight values.

423). A selection probability of each of the M routes may be determined based on the M first weight values and the M second weight values, and the M evaluation values may further be obtained.

A weight value of each of the M routes may be determined based on the N groups of data showing usage habits to obtain M first weight values. The weight value of each of the M routes may be determined based on the user travel data to obtain M second weight values. A selection probability of each of the M routes may be determined based on the M first weight values and the M second weight values to obtain the M evaluation values. To be specific, using a route C as an example, it is assumed that the first weight value corresponding to the route C is c1 and the second weight value corresponding to the route C is c2, and thus a product of c1 and c2 may be taken as an evaluation value of the route C.

According to the embodiments of the present disclosure, a message record may be acquired, the message record may be analyzed to obtain a starting location and a destination location, route planning may be performed based on the starting location and the destination location by using N map applications installed in advance to obtain M routes, wherein N is a positive integer, and M is a positive integer not less than N, and a target route may be selected from the M routes. In this way, the starting location and the destination location can be extracted from the message record, and navigation can be carried out accordingly. Thus, it is unnecessary for the user to open the navigation application and input the starting point and the destination, and an intelligent navigation route can be provided for the user to facilitate the travel for the user.

Figure 2:
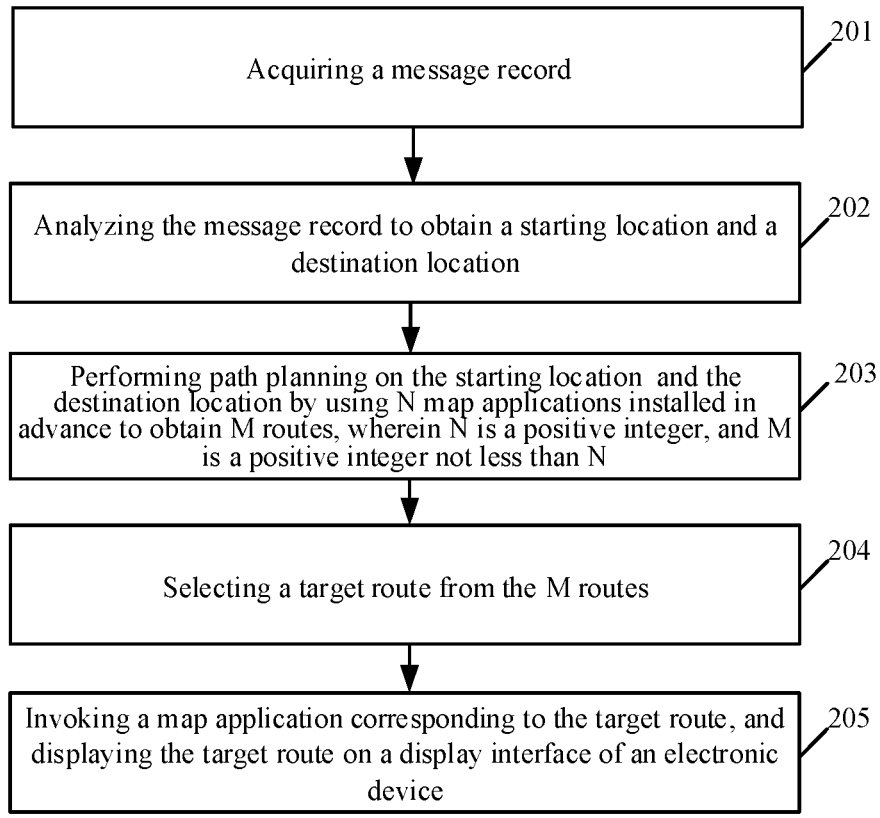
FIG. 2 is a flow chart of another navigation method according to an embodiment of the present disclosure.

As shown in FIG. 2, a flow chart of a navigation method according to an embodiment of the present disclosure may be illustrated. The navigation method described in the present embodiment includes following operations.

201: A message record may be acquired.

202: The message record may be analyzed to obtain a starting location and a destination location.

203: Route planning may be performed on the starting location and the destination location by using N map applications installed in advance to obtain M routes, wherein N is a positive integer, and M is a positive integer not less than N.

204: A target route may be selected from the M routes.

Alternatively, detailed descriptions of the operations of 201 to 204 may refer to corresponding operations as described in FIG. 1, and thus the operations of 201 to 204 will not be repeatedly described herein.

205: A map application corresponding to the target route may be invoked, and the target route may be displayed on an interface of an electronic device.

A map application corresponding to the target route may be invoked, and of course, other undesired map applications may be closed so as to display the target route on a display interface of an electronic device.

According to the embodiments of the present disclosure, a message record may be acquired, the message record may be analyzed to obtain a starting location and a destination location, route planning may be performed on the starting location and the destination location by using N map applications installed in advance to obtain M routes, wherein N is a positive integer and M is a positive integer not less than N, a target route may be selected from the M routes, a map application corresponding to the target route may be invoked, and the target route may be displayed on an interface of an electronic device. In this way, the starting location and the destination location may be extracted from the message record and displayed on the interface, and navigation may be carried out accordingly, thereby providing the user with an intelligent navigation route to facilitate the travel.

Figure 3A:
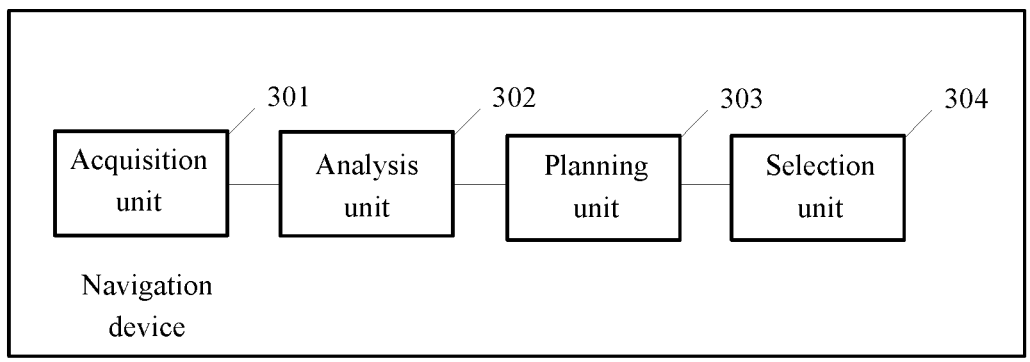
FIG. 3A is a schematic structural diagram of a navigation device according to an embodiment of the present disclosure.

As shown in FIG. 3A, a schematic structural view of a navigation device may be provided in the present embodiment. The navigation device may be applied for an electronic device, and the navigation device may include an acquisition unit 301, an analysis unit 302, a planning unit 303 and a selection unit 304 which are specifically described as follows.

The acquisition unit 301 may be configured to acquire a message record.

The analysis unit 302 may be configured to analyze the message record to obtain a starting location and a destination location.

The planning unit 303 may be configured to perform route planning based on the starting location and the destination location by using N map applications installed in advance to obtain M routes, wherein N is a positive integer, and M is a positive integer not less than N.

The selection unit 304 may be configured to select a target route from the M routes.

Figure 3B:
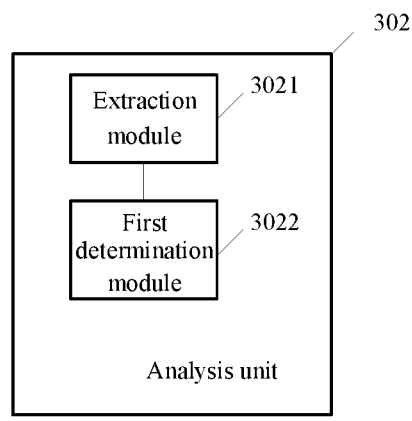
FIG. 3B is a schematic structural diagram of an analysis unit of the navigation device shown in FIG. 3A.

Alternatively, as shown in FIG. 3B, a detailed structure of the analysis unit 302 of the navigation device shown in FIG. 3A may be provided. The analysis unit 302 may include an extraction module 3021 and a first determination module 3022, which are specifically described as follows.

The extraction module 3021 is configured to extract N location names from the message record, wherein N is an integer greater than or equal to 2.

The first determination module 3022 is configured to determine the starting location and the destination location in combination with the context of the message record in which each of the N location names is located.

Figure 3C:
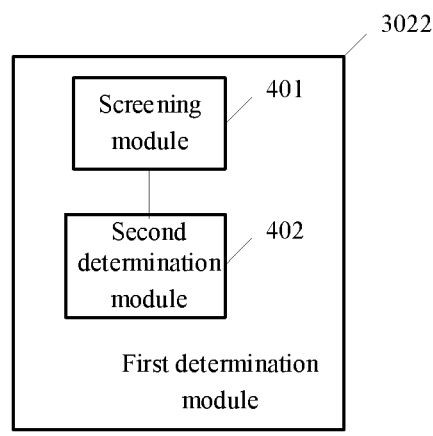
FIG. 3C is a schematic structural diagram of a first determination module of the analysis unit shown in FIG. 3B.

Alternatively, as shown in FIG. 3C, a detailed structure of the first determination module 3022 shown in FIG. 3B may be provided. The first determination module 3022 may include a screening module 401 and a second determination module 402 which are specifically described as follows.

The screening module 401 is configured to screen the N location names to obtain M location names, wherein M is an integer less than N and not less than 2.

The second determination module 402 is configured to perform semantic analysis on the M location names in combination with the context of the message record in which each location name in the M location names is located, determine first probability values of taking each of the M location names as a starting point and second probability values of taking each of the M location names as a destination location, and obtain M first probability values and M second probability values.

The second determination module 402 may further be configured to perform following operations.

The second determination module 402 may be configured to select a maximum first probability value and a maximum second probability value from the M first probability values and the M second probability values. Take a location name corresponding to the maximum first probability value as the starting location and a location name corresponding to the maximum second probability value as the destination location.

Figure 3D:
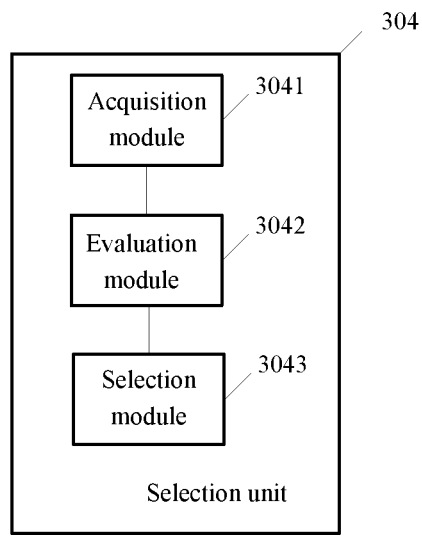
FIG. 3D is a schematic structural diagram of a selection unit of the navigation device shown in FIG. 3A.

Alternatively, as shown in FIG. 3D, a detailed structure of the selection unit 304 of the navigation device shown in FIG. 3A may be provided. The selection unit 304 may include an acquisition module 3041, an evaluation module 3042 and a selection module 3043, which are specifically described as follows.

The acquisition module 3041 may be configured to acquire N groups of data showing usage habits and user travel data corresponding to the N map applications.

The evaluation module 3042 may be configured to evaluate each of the M routes according to the N groups of data showing usage habits and the user travel data to obtain M evaluation values.

The selection module 3043 may be configured to select a maximum evaluation value from the M evaluation values, and take a route corresponding to the maximum evaluation value as the target route.

Figure 3E:
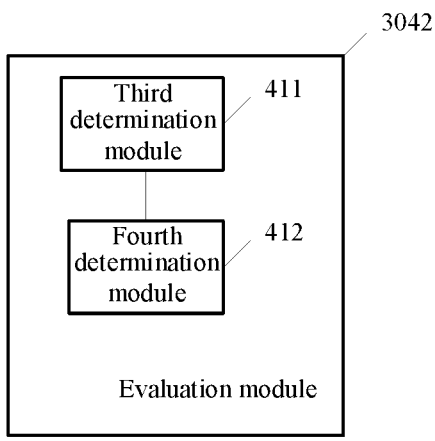
FIG. 3E is a schematic structural diagram of an evaluation module of the selection unit shown in FIG. 3D.

Alternatively, as shown in FIG. 3E, a detailed structure of the evaluation module 3042 shown in FIG. 3D may be provided. The evaluation module 3042 may include a third determination module 411 and a fourth determination module 412 which are specifically described as follows.

The third determination module 411 may be configured to determine a weight value of each of the M routes according to the N groups of data showing usage habits to obtain M first weight values.

The third determination module 411 may further be configured to perform following operations.

The third determination module 411 may be configured to determine a weight value of each of the M routes based on the user travel data to obtain M second weight values.

The fourth determination module 412 may be configured to determine a selection probability of each of the M routes based on the M first weight values and the M second weight values to obtain the M evaluation values.

Alternatively, the data showing usage habits may include at least one of the number of times of using each map application, the time spent on using each map application, and preferred navigation modes of each map application.

Figure 3F:
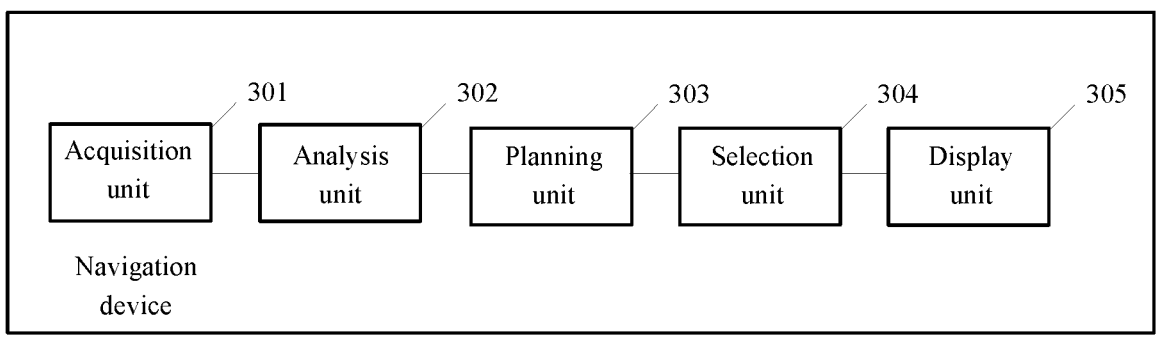
FIG. 3F is a schematic structural diagram of another variant of the navigation device shown in FIG. 3A.

Alternatively, as shown in FIG. 3F, another variant of the navigation device shown in FIG. 3A may be provided. The navigation device may further include a display unit 305 as compared to FIG. 3A, and the display unit 305 may be specifically described as follows.

The display unit 305 may be configured to invoke a map application corresponding to the target route, and display the target route on a display interface of an electronic device.

Alternatively, the message record is a message record within a preset time period, and the message record may include at least one of a text message record, a voice record and a chat record.

Alternatively, the acquisition unit 301 is further configured to acquire a confirmation instruction input by a user to confirm the starting location and the destination location. When the starting location and the destination location are confirmed to be correct, the planning unit 303 executes the operation of performing route planning on the starting location and the destination location by using N map applications installed in advance to obtain M routes, wherein N is a positive integer, and M is a positive integer not less than N.

It may be understood that functions of each of the program modules of the navigation device of the present embodiment may be implemented according to the method as described in the above-mentioned embodiments, and reference may be made to relevant description of the above embodiments of the method for the specific implementation process thereof, and thus, this will not be repeatedly described herein.

Figure 4:
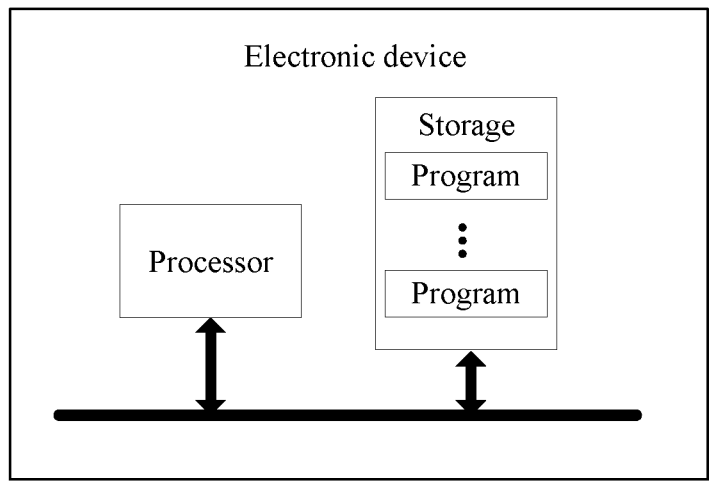
FIG. 4 is a schematic structural diagram of an electronic device according to an embodiment of the present disclosure.

As shown in FIG. 4, an electronic device according to an embodiment of the present disclosure may be illustrated. The electronic device may include a processor and a non-transitory memory. One or more program may be stored in the non-transitory memory and configured to be executed by the processor. The one or more program may include instructions for executing following operations.

A message record may be acquired.

The message record may be analyzed to obtain a starting location and a destination location.

Route planning may be performed based on the starting location and the destination location by using N map applications installed in advance to obtain M routes, wherein N is a positive integer, and M is a positive integer not less than N.

A target route may be selected from the M routes.

In a possible embodiment, in the aspect of analyzing the message record to obtain a starting location and a destination location, the instructions in the one or more program may be specifically configured to execute following operations.

N location names may be extracted from the message record, wherein N is an integer greater than or equal to 2;

The starting location and the destination location may be determined in combination with the context of the message record in which each of the N location names is located.

In one possible example, in the aspect of determining the starting location and the destination location in combination with the context of the message record in which each of the N location names is located, the instructions in the one or more programs may be specifically configured to execute following operations.

The N location names may be screened to obtain M location names, wherein M is an integer less than N and not less than 2.

Semantic analysis may be performed on the M location names in combination with the context of the message record in which each location name in the M location names is located. A first probability values of taking each of the M location names as the starting location and a second probability value of taking each of the M location names as the destination location may be determined, and M first probability values and M second probability values may be obtained.

A maximum first probability value and a maximum second probability value may be selected from the M first probability values and the M second probability values. A location name corresponding to the maximum first probability value may be determined as the starting location and a location name corresponding to the maximum second probability value may be determined as the destination location.

In one possible example, in the aspect of selecting a target route from the M routes, the instructions in the one or more programs may be specifically configured to execute following operations.

N groups of data showing usage habits and user travel data corresponding to the N map applications may be acquired.

Each of the M routes determined based on the N groups of data showing usage habits and the user travel data may be evaluated to obtain M evaluation values.

A maximum evaluation value from the M evaluation values may be selected, and a route corresponding to the maximum evaluation value may be determined to be the target route.

In one possible example, in the aspect of evaluating each of the M routes according to the N groups of data showing usage habits and the user travel data to obtain M evaluation values, the instructions in the one or more programs may be specifically configured to execute following operations.

A weight value of each of the M routes may be determined based on the N groups of data showing usage habits to obtain M first weight values.

A weight value of each of the M routes may be determined based on the user travel data to obtain M second weight values.

A selection probability of the M routes may be determined based on the M first weight values and the M second weight values to obtain the M evaluation values.

Figure 5:
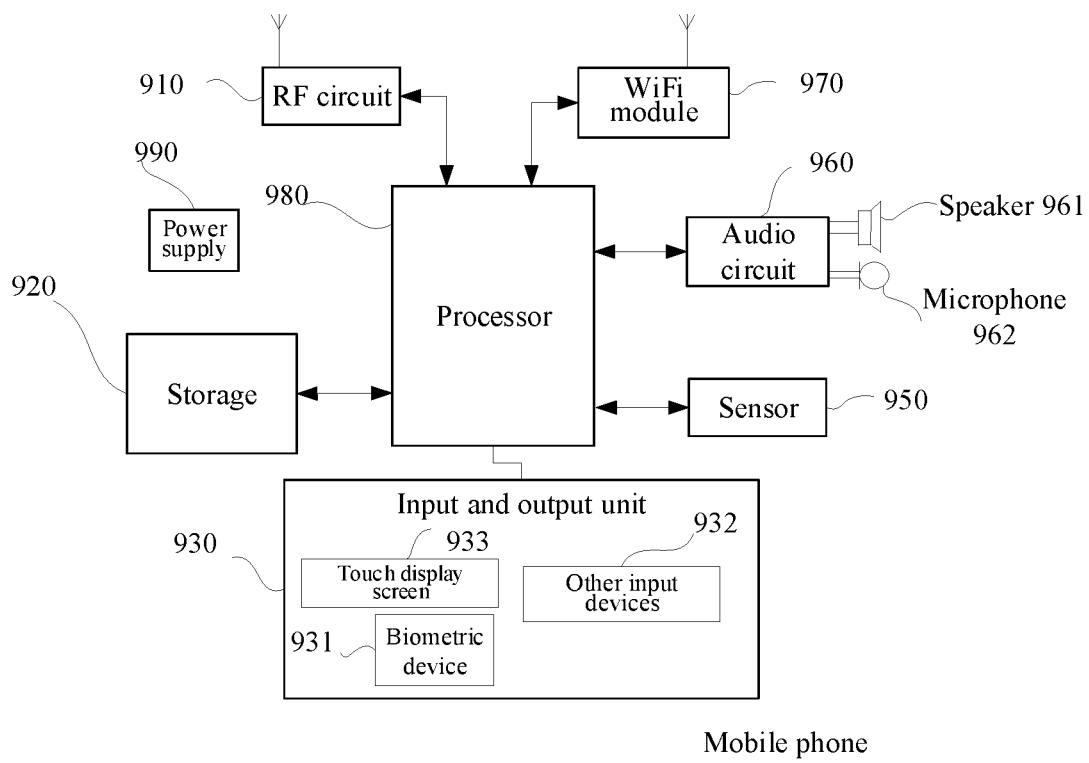
FIG. 5 is a schematic structural diagram of another electronic device disclosed according to an embodiment of the present disclosure.

An embodiment of the present disclosure further provides another electronic device as shown in FIG. 5. For an easy explanation, only parts related to the embodiments of the present disclosure are shown. Details of technical solutions are not illustrated hereafter, but may refer to the above-mentioned embodiments of the present disclosure. The electronic device may be any terminal device including a mobile phone, a tablet computer, a Personal Digital Assistant (PDA), a Point of Sales (POS), a vehicle-mounted computer or the like, and the case in which the electronic device is a mobile phone is taken as an example.

FIG. 5 shows a diagram of a partial structure of a mobile phone related to the electronic device provided in the embodiment of the present disclosure. Referring to FIG. 5, the mobile phone may include components such as a Radio Frequency (RF) circuit 910, a non-transitory memory 920, an input unit 930, a sensor 950, an audio circuit 960, a Wireless Fidelity (WiFi) module 970, a processor 980, and a power supply 990 or the like. It may be understood to those skilled in the art, the structure of the mobile phone shown in FIG. 5 does not limit structures of a mobile phone. The mobile phone may include more or fewer components than those shown in the figure, or some components may be combined, or the components may be disposed in different arrangements.

Each of the components of the mobile phone will be described specifically hereinafter with reference to FIG. 5.

The input unit 930 may be configured to receive input digital or character information and generate key signal inputs related to user setting and functional controls of the mobile phone. To be specific, the input unit 930 may include a touch display screen 933, a biometric apparatus 931 and other input devices 932. The biometric apparatus 931 may be a fingerprint identification apparatus, an iris identification apparatus, or a face identification apparatus. The input unit 930 may also comprise other input devices 932. Specifically, other input devices 932 may include, but are not limited to, one or more of a physical key, a function key (such as a volume control key, a switch key, etc.), a trackball, a mouse, a joystick or the like.

The processor 980 is configured to perform following operations.

A message record may be acquired.

The message record may be analyzed to obtain a starting location and a destination location.

Route planning may be performed on the starting location and the destination location by using N map applications installed in advance to obtain M routes, wherein N is a positive integer, and M is a positive integer not less than N.

A target route may be selected from the M routes.

The processor 980 is a control center of the mobile phone, uses various interfaces and lines to connect various components of the mobile phone, performs various functions of the mobile phone and processes data by running or executing software programs and/or modules stored in the non-transitory memory 920 and invoking data stored in the non-transitory memory 920, thereby monitoring the mobile phone as a whole. Alternatively, the processor 980 may include one or more processing units; and alternatively, the processor 980 may integrate a processor with a modem processor, wherein the processor substantially processes an operating system, a user interface, and an application program or the like, and the modem processor substantially processes wireless communication. It may be understood that the above-mentioned modem processor may also not be integrated into the processor 980.

In addition, the non-transitory memory 920 may include a high-speed random access storage and may also include a non-volatile non-transitory storage, such as at least one disk storage device, a flash storage device, or other volatile solid-state storage devices.

The RF circuit 910 may be used for receiving and transmitting information. Generally, the RF circuit 910 includes, but is not limited to, an antenna, at least one amplifier, a transceiver, a coupler, a Low Noise Amplifier (LNA), a duplexer or the like. In addition, the RF circuit 910 may also communicate with other devices through wireless communication and networks. The above wireless communication may use any communication standard or protocol, including but not limited to Global System of Mobile Communication (GSM), General Packet Radio Service (GPRS), Code Division Multiple Access (CDMA), Wide-band Code Division Multiple Access (WCDMA), Long Term Evolution (LTE), E-mail, Short Messaging Service (SMS) or the like.

The mobile phone may also include at least one sensor 950, such as a light sensor, a motion sensor and other sensors. To be specific, the light sensor may include an ambient light sensor and a proximity sensor, wherein the ambient light sensor may adjust the brightness of the touch display screen according to the brightness of the ambient light, and the proximity sensor may turn off the touch display screen and/or the backlight when the mobile phone moves to approach the ear. As a kind of motion sensor, an accelerometer sensor may detect the magnitude of acceleration in all directions (generally on three axes), may detect the magnitude and direction of gravity when it is stationary, may be used for application of posture identification of the mobile phone (such as horizontal and vertical screen switching, related games, magnetometer posture calibration), and used for vibration identification of related functions (e.g., a pedometer, tapping) or the like. The mobile phone may also be provided with other sensors such as a gyroscope, a barometer, a hygrometer, a thermometer, an infrared sensor or the like, and this will not be further described herein.

The audio circuit 960, a speaker 961 and a microphone 962 may provide an audio interface between a user and a mobile phone. The audio circuit 960 may transmit an electrical signal converted from the received audio data to the speaker 961, and the speaker 961 converts the electrical signal into a sound signal for playing. On the other hand, the microphone 962 converts the collected sound signal into an electrical signal, and the electrical signal is received by the audio circuit 960 and then converted into audio data. After being processed by the processor 980, the audio data is sent for example to another mobile phone via the RF circuit 910, or the audio data is played to the storage 920 for further processing.

WiFi belongs to a short-range wireless transmission technology. The mobile phone may help users send and receive e-mails, browse web pages and access streaming media through the WiFi module 970, thus providing users with wireless broadband internet access. Although FIG. 5 shows WiFi module 970, it may be understood that, the WiFi module 970 is not a necessary constituent of a mobile phone and it may be possible to omit the WiFi module 970 as needed without changing the essential scope of the present disclosure.

The mobile phone further includes a power supply 990 (e.g., a battery) for supplying power to various components. Alternatively, the power supply may be logically connected to the processor 980 through a power management system, thereby achieving functions of managing charging, discharging, and power consumption management and the like through the power management system.

Although not shown, the mobile phone may also include a camera, a Bluetooth module or the like, and this will not be further described herein.

In the embodiments shown in above FIG. 1 and FIG. 2, the flow of the operations of the method may be achieved based on the structure of the mobile phone.

In the embodiments shown in above FIG. 3A to FIG. 3F and FIG. 4, the functions of the units can be achieved based on the structure of the mobile phone.

An embodiment of the present disclosure further provides a non-transitory computer storage medium which stores computer programs for electronic data exchange, wherein the computer programs enable a computer to execute a part of or all of the steps of any navigation method as recorded in the above embodiments of the method.

An embodiment of the present disclosure further provides a computer program product which includes a non-transitory computer readable storage medium storing computer programs, and the computer programs are operable to enable a computer to execute a part of or all of the operations of any navigation method as recorded in the above embodiments of the method.

It shall be noted that, for ease of description, the embodiments of the aforementioned method are all expressed as a series of action combinations. However, as shall be understood by those skilled in the art, the present disclosure is not limited by the described action sequence, because some steps may be performed in other sequences or at the same time according to the present disclosure. Secondly, as shall also be understood by those skilled in the art, the embodiments described in the specification are all optional embodiments, and the actions and modules involved are not necessarily required by the present disclosure.

In the above-mentioned embodiments, the description of each embodiment is focused on certain aspects thereof. Reference may be made to the related description of other embodiments for parts not detailed in a certain embodiment.

It shall be appreciated that, the devices disclosed in the embodiments provided in the present disclosure may be accomplished in other ways. For example, the implementation of the device described above is only schematic, for instance, the division of the units is only a division in terms of logic functions, but other divisional manners are possible in a practical implementation. For example, multiple units or components may be combined or integrated into another system, or some features may be negligible or not executed. In addition, the coupling or direct coupling or communicative connection between the components that are shown or discussed may be accomplished by some interfaces, and indirect coupling or communicative connection between devices or units may be electrical or by other means.

A unit that is illustrated as a separate part may be or may not be physically separated, and a part that is displayed as a unit may be or may not be a physical unit, and that is the part may be located at one place or may be distributed over multiple network units. The objective of the solution of this implementation can be achieved by selecting part or all of the units depending on practical needs.

Moreover, the functional units in the embodiments of the present disclosure may be integrated into one processing unit, or each of the units exists separately as a physical unit, or two or more of the units are integrated into one unit. The integrated unit described above may be implemented in the form of hardware or may be implemented in the form of a software program module.

When the integrated unit is implemented in the form of a software program module and sold or used as an independent product, it may be stored in one non-transitory computer readable storage. Based on such understanding, technical solutions of the present disclosure may be substantially embodied in the form of a software product or part of the technical solution that contributes to the prior art or all or part of the technical solution may be embodied in the form of a software product. The computer software product is stored in one non-transitory storage and includes multiple instructions to enable a computer apparatus (which may be a personal computer, a server, or a network apparatus or the like) to execute all or part of the operations of the methods of the embodiments according to the present disclosure. The non-transitory storage described above includes various media that are capable of storing program codes, such as a USB disk, a read-only memory (ROM), a random access memory (RAM), a mobile hard disk, a magnetic disk or a compact disk or the like.

It may be understood by those ordinary skilled in the art, all or part of the operations in various methods of the above-mentioned embodiments may be completed by instructing relevant hardware through programs, the programs may be stored in a non-transitory computer readable storage, and the non-transitory storage may include a flash disk, a read-only memory (ROM), a random access memory (RAM), a magnetic disk or an optical disk or the like.

The above detailed description of the embodiments of the present disclosure may provide specific examples to illustrate principles and implementations of the present disclosure. The illustration of the above-mentioned embodiments is for the purposes of understanding the method provided in the present disclosure and the essence thereof. To ordinary skilled in the related art, according to the spirit of the present disclosure, implementations and applications of the present disclosure may be modified, and contents of the present disclosure shall not limit the scope of the present disclosure.

What is claimed is:

1. A method for navigation, adapted in an electronic device, comprising:
   acquiring a message record;
   analyzing the message record to obtain a starting location and a destination location;
   performing route planning based on the starting location and the destination location through N map applications installed in the electronic device to obtain M routes, wherein N is a positive integer, and M is a positive integer not less than N; and
   selecting a target route from the M routes, comprising:
      acquiring N groups of data showing usage habits and user travel data corresponding to the N map applications, wherein the data showing usage habits comprises at least one of the number of times that each of the N map applications is used, time duration that each of the N map applications is used, and a navigation mode in each of the N map applications; and the user travel data comprises travel time and a travel mode corresponding to the travel time;
      evaluating each of the M routes according to the N groups of data showing usage habits and user travel data to obtain M evaluation values; and
      selecting a maximum evaluation value from the M evaluation values, and taking a route corresponding to the maximum evaluation value as the target route.

2. The method according to claim 1, wherein analyzing the message record to obtain the starting location and the destination location comprises:
   extracting A location names from the message record, wherein A is an integer greater than or equal to 2; and
   determining the starting location and the destination location in combination with the context of the message record in which each of the A location names is located.

3. The method according to claim 2, wherein determining the starting location and the destination location in combination with the context of the message record in which each of the A location names is located comprises:
   screening the A location names to obtain B location names, wherein the B location names are phrased with keywords suggesting a moving direction, and B is an integer less than N and not less than 2;
   performing semantic analysis on the B location names in combination with the context of the message record in which each of the B location names is located, determining a first probability value of each of the B location names being the starting location and a second probability value of each of the B location names being the destination location, such that obtaining B first probability values and B second probability values; and
   selecting a maximum first probability value and a maximum second probability value from the B first probability values and the B second probability values, and setting a location name corresponding to the maximum first probability value as the starting location and a location name corresponding to the maximum second probability value as the destination location.

4. The method according to claim 1, wherein evaluating each of the M routes according to the N groups of data showing usage habits and the user travel data to obtain M evaluation values comprises:
   determining a first weight value of each of the M routes according to the N groups of usage habit data to obtain M first weight values;
   determining a second weight value of each of the M routes according to the user travel data to obtain M second weight values; and
   determining a selection probability of each of the M routes according to the M first weight values and the M second weight values to obtain the M evaluation values.

5. The method according to claim 1, further comprising:
   invoking a map application corresponding to the target route, and displaying the target route on a display interface of the electronic device.

6. The method according to claim 1, wherein the message record comprises message records within a preset time period, and the message record comprises at least one of a text message record, a voice record or a chat record.

7. The method according to claim 1, further comprising:
   acquiring a confirmation instruction input by a user to confirm the starting location and the destination location;
   executing the performing route planning based on the starting location and the destination location through N map applications installed in the electronic device to obtain M routes in response to the starting location and the destination location being confirmed to be correct, wherein N is a positive integer, and M is a positive integer not less than N; and
   inputting a correct starting location and a correct destination location by the user for route planning in response to the starting location and the destination location being confirmed to be incorrect.

8. A navigation device, comprising a processor and a non-transitory memory, wherein the non-transitory memory stores a plurality of instructions, and the plurality of instructions may be executed by the processor to perform a method for navigation, wherein the method comprises:
   acquiring a message record;
   analyzing the message record to obtain a starting location and a destination location;
   performing route planning based on the starting location and the destination location through N map applications installed to obtain M routes, wherein N is a positive integer, and M is a positive integer not less than N; and
   selecting a target route from the M routes, comprising:
      acquiring N groups of data showing usage habits and user travel data corresponding to the N map applications, wherein the data showing usage habits comprises at least one of the number of times that each of the N map applications is used, time duration that each of the N map applications is used, and a navigation mode in each of the N map applications; and the user travel data comprises travel time and a travel mode corresponding to the travel time;
      evaluating each of the M routes according to the N groups of data showing usage habits and user travel data to obtain M evaluation values; and
      selecting a maximum evaluation value from the M evaluation values, and taking a route corresponding to the maximum evaluation value as the target route.

9. The navigation device according to claim 8, wherein analyzing the message record to obtain the starting location and the destination location comprises:
   extracting A location names from the message record, wherein A is an integer greater than or equal to 2; and
   determining the starting location and the destination location in combination with the context of the message record in which each of the A location names is located.

10. The navigation device according to claim 9, wherein determining the starting location and the destination location in combination with the context of the message record in which each of the A location names is located comprises:
  screening the A location names to obtain B location names, wherein the B location names are phrased with keywords suggesting a moving direction, and B is an integer less than N and not less than 2;
  performing semantic analysis on the B location names in combination with the context of the message record in which each of the B location names is located, determining a first probability value of each of the B location names being the starting location and a second probability value of each of B location name being a destination location, and obtaining B first probability values and B second probability values; and
  selecting a maximum first probability value and a maximum second probability value from the B first probability values and the B second probability values, and setting a location name corresponding to the maximum first probability value as the starting location and a location name corresponding to the maximum second probability value as the destination location.

11. The navigation device according to claim 8, wherein evaluating each of the M routes according to the N groups of data showing usage habits and the user travel data to obtain M evaluation values comprises:
  determining a first weight value of each of the M routes according to the N groups of data showing usage habits to obtain M first weight values;
  determining a second weight value of each of the M routes according to the user travel data to obtain M second weight values; and
  determining a selection probability of each of the M routes according to the M first weight values and the M second weight values to obtain the M evaluation values.

12. The navigation device according to claim 10, wherein the method further comprises:
  invoking a map application corresponding to the target route, and displaying the target route on a display interface of the navigation device.

13. The navigation device according to claim 8, wherein the message record comprises message records within a preset time period, and the message record comprises at least one of a text message record, a voice record or a chat record.

14. The navigation device according to claim 8, wherein the method further comprising:
  acquiring a confirmation instruction input by a user to confirm the starting location and the destination location;
  executing the performing route planning based on the starting location and the destination location through N map applications installed in the navigation device to obtain M routes in response to the starting location and the destination location being confirmed to be correct, wherein N is a positive integer, and M is a positive integer not less than N; and
  inputting a correct starting location and a correct destination location by the user for route planning in response to the starting location and the destination location being confirmed to be incorrect.

15. A non-transitory storage medium, for storing a plurality of instructions which are able to be executed by a processor to perform a method for navigation, wherein the method comprises:
  acquiring a message record;
  analyzing the message record to obtain a starting location and a destination location;
  performing route planning based on the starting location and the destination location through N map applications installed in an electronic device to obtain M routes, wherein N is a positive integer, and M is a positive integer not less than N; and
  selecting a target route from the M routes, comprising:
    acquiring N groups of data showing usage habits and user travel data corresponding to the N map applications, wherein the data showing usage habits comprises at least one of the number of times that each of the N map applications is used, time duration that each of the N map applications is used, and a navigation mode in each of the N map applications; and the user travel data comprises travel time and a travel mode corresponding to the travel time;
    evaluating each of the M routes according to the N groups of data showing usage habits and user travel data to obtain M evaluation values; and
    selecting a maximum evaluation value from the M evaluation values, and taking a route corresponding to the maximum evaluation value as the target route.

16. The non-transitory storage medium according to claim 15, wherein analyzing the message record to obtain the starting location and the destination location comprises:
  extracting A location names from the message record, wherein A is an integer greater than or equal to 2; and
  determining the starting location and the destination location in combination with the context of the message record in which each of the A location names is located.

* * * * *